Patented May 12, 1936

2,040,075

UNITED STATES PATENT OFFICE 2,040,075

TRANSFER PROCESS

Paul V. Brower, Maywood, Ill., assignor to Ditto, Incorporated, a corporation of West Virginia No Drawing. Application January 24, 1935,
Serial No. 3,289

11 Claims. (Cl. 41—31.5)

The present invention relates to improvements in transfer processes, and more particulary relates to transfer processes for effecting reproduction or transfer of designs, drawings, written and typewritten material and the like from an original or master copy.

In certain of the transfer or reproduction processes of the general character hereinbefore referred to, a master copy is prepared in reverse by drawing, writing, typing or otherwise producing the design on a master sheet, behind which is a sheet of suitably prepared carbon paper with its inked surface facing the master sheet, so that color constituents of the ink on the carbon paper are transferred to the back of the sheet, forming a reverse copy of the design or writing. In preparing copies from this master sheet, the surface of the copy sheet is moistened with a liquid, usually a water-miscible alcoholic liquid, which has a solvent action on the dyes in the ink deposited on the master sheet from the carbon paper, and the moistened copy sheet is applied to the back of the master sheet, a positive image of the original being thereby reproduced upon the copy sheet. In carrying out such processes hitherto, aqueous and alcoholic solvents have usually been employed in effecting the transfer and the dyes used in the carbon paper employed have been water-soluble. Hence, the character of colors available for use in such processess has been seriously limited in many directions; for example, by lack of blacks and by lack of colors of greater fastness to light; and the water-soluble character of the dyes has resulted in soiling the fingers of users of the paper and in smudging and blurring impressions on handling.

In accordance with the present invention, the coloring matters or dyes employed in the inks used in the transfer process are of the character designated as oil-soluble, such as oil-soluble basic dyes and the organic acid salts of basic dyes, such dye substances being not appreciably water-soluble. In conjunction with such coloring matters, volatile non-aqueous solvents are used in effecting the transfer operation, such as oil-miscible solvents which are not water-soluble or miscible with water in any substantial proportions as well as alcohols, glycol ethers, and the like.

Thus, in carrying out the present invention, in the preparation of the carbon papers carrying the coloring material or dye, I employ, for example, basic azo and amino-azo dyes such as azo-black, the azine dyes, such as the nigrosines, indulines and the like, methyl violet, crystal violet, fuchsine, anthraquinone dyes and chrysoidine and the like with organic acids, such as the higher fatty acids, lactic acid, abietic acid, tannic acid, gallic acid, tartaric acid, chloro-acetic acids, chloro-benzoic acids, or the like, or mixtures thereof. In general, I prefer to employ such salts of the higher fatty acids, such as the stearates, oleates, palmitates, laurates, abietates and the like as the sole or principal color constituents in the carbon paper coatings or transfer inks used in practicing the present invention. In conjunction therewith, I employ in the transfer process non-aqueous transfer liquids or solvents of a suitable volatility such as the lower alcohols, glycol ethers, the lower ketones, acetone, ethyl-methyl ketone and the like, lower hydrocarbons, such as the narrow boiling-point range cleaner's naphthas, volatile cholrinated hydrocarbons such as carbon tetrachloride, dichloroethane and the like and the fluorochloroethanes such as trifluorotrichloroethane, difluorotetrachloroethane and the like and various mixtures including such solvents. I have found particularly suitable the fluorochloroethane products described in my copending application Serial No. 743,114, filed September 7, 1934.

By operating in accordance with the present invention, I have been able to employ and secure colors of a character hitherto not available in such transfer processes, for example, fast colors and blacks or colors closely approximating blacks. To illustrate the invention, operations will be described wherein black or substantially black colors are employed, although as hereinafter more fully pointed out, dyes of the classification referred to above and effective for the production of other colors may, of course, be employed.

Thus, in preparing the color mixture used in the carbon paper employed in the process, for securing blacks, I have found the organic acid salts of the nigrosine and of the induline bases to be particularly suitable. When black copies are desired, the mixtures prepared with nigrosine compounds give the blackest copies and those prepared with induline compounds give the most intense copies. While either the nigrosine or the induline compounds may be employed alone, I prefer to use mixtures thereof, suitably in proportion of one-fifth to one-half of the induline compound and four-fifths to one-half of the nigrosine compound, although these proportions may, of course, be varied. Various commercial nigrosine and induline dyes differ slightly in their characteristics and physical properties, and in certain cases hereinafter have been designated for identification purposes by their commercial names and sources. Spirit-soluble nigrosine jet (General Dyestuff Co.) has been found to be advantageous as a color constituent, as it reduces the tackiness of the color layer and improves the release or "let-down" of the color from the carbon paper.

The basic dyes or mixture of dyes are heated with suitable proportions of the selected organic acids to secure the desired salts. As pointed out hereinbefore, the organic acids employed may be, for example, tartaric acid, lactic acid, tannic acid, the chloroacetic acids, abietic acid, or the higher fatty acids, or mixtures thereof. In general I prefer to employ the higher fatty acids, such as stearic, palmitic or oleic acid, and abietic acid, either alone or as the principal acid combined with the basic dye. I have found the use of stearic acid to be highly desirable, as the salts which it forms with the basic dyes are of high melting point and therefore the proportions of wax, higher alcohols or other hardening agents required in preparing the carbon paper may be reduced. The use therewith of varying proportions of other organic acids, such as lactic and tartaric acid, and particularly the latter is desirable, as they reduce a tendency to tackiness or stickiness in the color coating. Thus, as the acid constituent of the dye, I may use mixtures of a fatty acid, such as stearic acid, with tartaric acid containing from one-tenth to one-third of the latter. These proportions may, of course, be varied according to the dye and the fatty acid employed.

In preparing the coating for the carbon paper used in the transfer process, in conjunction with the oil-soluble dye compound hardening agents miscible therewith are employed. For example, I may employ the harder waxes and wax-like bodies such as the halogenated naphthalenes, the hard waxes of the character of carnauba wax, palm wax, japan wax, Montan wax and the like. Manufactured or synthetic substitutes for such waxes may, of course, be employed, such as that known as "I. G. wax S" which is similar to Montan wax in its characteristics. It will be noted that the waxes preferably employed have melting point ranges from somewhat above 50° C. to somewhat below 100° C. It will be readily apparent that mixtures of these waxes may be employed to secure any desired characteristics.

Other modifying agents may be employed in the mixture; for example, higher alcohols such as cetyl or ceryl alcohol, stearol, oleol, palmitol, lauryl alcohol, myrystyl alcohol, or the like, may be employed in suitable proportions for lessening stickiness and tackiness of the dye mixture applied to the carbon paper used in the process. Mineral oil may be included in the mixture to modify the characteristics of the coating, preferably a refined or light colored, viscous distillate oil of a viscosity of about 150–155 seconds Saybolt at 100° F. The texture and smoothness of the mixture may also be improved and separation and granulation of waxes prevented by the addition of small proportions, in general less than 1% of fatty acid salts of alkyl and alcohol amines, such as of diethyl amine or triethanol amine stearate.

The proportions of the constituents of the mixture used on the carbon paper employed in the process may vary somewhat; for example, the proportion of dye base or mixture of dye bases may be from 0.5 to 2 parts; the acid constituent or fatty acid constituent or mixture thereof may constitute 0.5 to 2 parts, being proportioned generally so as to provide slightly less than the molecular equivalent of the dye base used, when waxes are employed with the mixture, the waxes ordinarily supplying additional acid; the amount of wax present may vary from 0.1 to 0.75 parts and from one-half to one and one-half parts of higher alcohols may be present. Minor proportions of insoluble pigments or fillers may be present, but are generally not desirable.

The following examples illustrate suitable mixtures containing oil-soluble basic dye compounds for use as a coating on carbon paper employed in carrying out the present invention.

In certain cases, available commercial products have been designated, in addition, by their trade names in some cases by their source or manufacturer.

*Example No. 1*

| | Parts |
|---|---|
| Nigrosine base N (National Aniline Co.) | 10 |
| Stearic acid | 10 |
| Mixture of stearol, oleo and palmitol ("Stenol") | 10 |
| Carnauba wax | 2 |

*Example No. 2*

| | Parts |
|---|---|
| Nigrosine base N | 7 |
| Induline base B | 3 |
| Stearic acid | 7 |
| Tartaric acid | 3 |
| Higher alcohols | 10 |
| Montan wax or carnauba wax | 2 |

*Example No. 3*

| | Parts |
|---|---|
| Nigrosine base N | 10 |
| Induline base B | 8 |
| Abietic acid | 3 |
| Stearic acid | 5 |
| Cetyl alcohol | 4 |
| Carnauba wax | 8 |
| Mineral oil | 12 |

*Example No. 4*

| | Parts |
|---|---|
| Nigrosine base N | 10 |
| Induline base B | 5 |
| Spirit soluble nigrosine jet | 10 |
| Stearic acid | 5 |
| Carnauba wax | 8 |
| Mineral oil | 13 |
| Triethanol amine stearate | 0.5 |

These compositions may, of course, be widely modified as hereinbefore indicated, other suitable compositions being set forth in my copending application Serial No. 3,288, filed January 24, 1935. Other basic dyes may be employed in accordance with color desired.

The constituents of the ink or coating may be melted together and thoroughly mixed and blended, thereby effecting combination of the basic dye with the organic acid constituents. The melted mixture may then be coated on carbon paper tissue in the usual manner, while molten, if desired. However, the induline and nigrosine dyes, upon being heated or subjected to high temperatures, particularly for appreciable lengths of time, may become thick, less soluble in solvents, and lose tinctorial strength. Hence in the preparation and application of these mixtures, they should be heated as little for as short periods as possible. A formula such as that of Example No. 4 supra is particularly susceptible to heat, whereas a formula such as that of Example No.

3 is markedly less susceptible to heat. The abietic acid appears to reduce the sensitiveness of the induline and nigrosine bases (and salts) to heat and the cetyl alcohol has a similar action.

In preparing carbon papers from color mixtures prepared in accordance with my invention, instead of applying the mixture in molten form to the tissue, the mixture, prepared with a minimum of heating to secure proper blending and formation of the organic dye salts, may be reduced to paste form by the use of suitable solvents, such as carbon tetrachloride, toluene or the like. Sufficient solvent is incorporated, suitably by grinding or mixing at a temperature slightly below the boiling point of the solvent, to secure a paste which can be applied by the usual coating rolls. The weight of the solvent employed will vary somewhat and may be approximately equal to the weight of the color mixture. After thorough mixture the mixture may be cooled to normal room temperatures and applied at such temperatures.

The application of the coating mixture with a solvent of this manner results in a character of coating which gives results in the transfer process superior to those secured when the coating mixture is applied to the tissue in molten form. In the molten process the coating on the tissue has a glazed or impervious surface and in the transfer process the maximum intensity of copies is not reached until a considerable number of more or less weak copies have been made. When applied by the solvent process the coating has a dry and porous character, is readily wetted by the solvent used in the transfer process, and the strength of copies has a maximum intensity on the first or second copy.

In carrying out the transfer process in accordance with the present invention, a carbon paper having in its pigment layer coloring matters of the character hereinbefore described is applied to the back of the master sheet and the latter is then subjected to the customary operation of drawing, writing or typing to produce the desired design or written matter thereupon, the oil-soluble coloring matter on the carbon paper being transferred to the back of the master copy in the operation. A copy sheet is moistened with a suitable volatile, substantially non-aqueous solvent liquid. For this purpose lower alcohols containing up to about 5% water, lactones, volatile ethers of glycol or diethylene glycol or suitable mixtures containing them may be employed, as may also volatile hydrocarbons, halogenated hydrocarbons such as carbon tetrachloride, dichloroethane or preferably a fluorochloroethane or mixture of fluorochloroethanes such as is described in my prior application Serial No. 743,114 hereinbefore referred to. Thus, the lower alcohols, such as methyl, ethyl, isopropyl or butyl alcohol may be employed, although ethyl alcohol is preferred for its low toxicity, or naphtha, toluene or the like may be employed alone or in admixture with other solvents. Thus, another suitable solvent mixture may contain from 60 to 70% alcohol, from 5 to 10% acetone, from 3 to 8% ethyl ether of glycol and 10 to 25% of a suitable volatile petroleum or solvent naphtha cut of a narrow range of boiling points. Either the acetone or volatile glycol ether may be omitted from the solvent, the proportion of the remaining constituent being preferably increased, these compounds aiding in blending or securing miscibility of the alcohol and hydrocarbon. Small amounts, say 1 to 4%, of a relatively non-volatile solvent and oil-miscible liquid, such as castor oil or butyl ether of diethylene glycol may be included, as it aids in keeping the ink on the master copy in good condition for reuse.

The copy sheet moistened with the selected solvent is then applied to the back of the master sheet and receives sufficient of the oil-soluble coloring matter deposited on the latter to reproduce the design or written matter on the master sheet. The solvent liquid is then permitted to evaporate from the copy sheet and additional copy sheets are prepared and receive the design or written matter in the same manner until the desired number are prepared or the coloring matter is exhausted.

As pointed out hereinbefore, by operating in accordance with the present invention it is possible to secure, in the copy sheets, colors having characteristics not hitherto reproducible, and particularly colors that are fast and black or substantially black colors. It is readily apparent that any desired color may be secured by a suitable selection of the basic dye and of the organic acid used in connection therewith. Thus, as pointed out hereinbefore, the dye bases employed may also be such as methyl violet, crystal violet, fuchsine, the anthraquinone dyes, other azine, azo or amino-azo dyes, chrysoidine or the like. Furthermore, although in the description hereinbefore given, the oil-soluble dyes or dye salts have been described in connection with their incorporation with the ink layers of carbon paper, it is readily apparent that they may also be incorporated into pencils with wax or wax-like binders or into inks or typewriter ribbons for application to the master copy.

I claim:

1. The process of reproduction which comprises applying to a master sheet an oil-soluble color substance to form a design in reverse, moistening a copy sheet with a volatile, substantially non-aqueous solvent and applying the moistened copy sheet to the side of the master sheet bearing said color substance, thereby transferring a portion of said color substance to said copy sheet to form the design thereon.

2. The process of reproduction which comprises applying to a master sheet an oil-soluble basic dye substance to form a design in reverse, moistening a copy sheet with a volatile substantially non-aqueous solvent and applying the mostened copy sheet to the side of the master sheet bearing said color substance, thereby transferring a portion of the color substance to said copy sheet to form the design thereon.

3. The process of reproduction which comprises applying to a master sheet an oil-soluble salt of a basic dye with an organic acid to form a design in reverse, moistening a copy sheet with a volatile substantially non-aqueous solvent and applying the moistened copy sheet to the side of the master sheet bearing said basic dye salt, thereby transferring a portion of the dye substance to said copy sheet to form the design thereon.

4. The process of reproduction which comprises applying to a master sheet an oil-soluble salt of a basic dye with a fatty acid to form a design in reverse, moistening a copy sheet with a volatile, substantially non-aqueous solvent and applying the moistened copy sheet to the side of the master sheet bearing said dye substance thereby transferring a portion of the dye substance to said copy sheet to form a design thereon.

5. The process of reproduction which comprises applying to a master sheet an oil-soluble basic dye stearate to form a design in reverse, moistening a copy sheet with a volatile, substantially non-aqueous solvent and applying the moistened copy sheet to the side of the master sheet bearing said basic dye stearate, thereby transferring a portion of the basic dye stearate to said copy sheet to form a design thereon.

6. The process of reproduction which comprises applying to a master sheet an oil-soluble salt of a basic dye with a fatty acid to form a design in reverse, moistening a copy of the sheet with a volatile, oil-solvent halogenated hydrocarbon and applying the moistened copy sheet to the side of the master sheet bearing said dye salt, thereby transferring a portion of the dye salt to said copy sheet to form the design thereon.

7. The process of reproduction which comprises applying to a master sheet an oil-soluble salt of a basic dye and an organic acid to form a design in reverse, moistening a copy sheet with a volatile, oil-solvent fluorochloroethane and applying the moistened copy sheet to the side of the master sheet bearing said dye salt, thereby transferring a portion of the dye salt to said copy sheet to form the design thereon.

8. The process of reproduction which comprises applying to a master sheet an oil-soluble color substance of the class consisting of nigrosine base and induline base fatty acid salts to form a design in reverse, moistening a copy sheet with a volatile fluorochloroethane and applying the moistened copy sheet to the side of the master sheet bearing said color substance, thereby transferring a portion of the color substance to said copy sheet to form a design thereon.

9. The process of effecting transfers which comprises applying to a master sheet a mixture of an oil-soluble basic dye substance and a hardening agent miscible therewith to form a design in reverse, moistening a copy sheet with a volatile, substantially non-aqueous solvent and applying the moistened copy sheet to the side of the master sheet bearing said color substance, thereby transferring a portion of the color substance to said copy sheet to form the design thereon.

10. The process of effecting transfers which comprises applying to a master sheet a mixture of an oil-soluble salt of a basic dye with an organic acid and a hardening agent miscible therewith to form a design in reverse, moistening a copy sheet with a volatile, substantially non-aqueous solvent and applying the moistened copy sheet to the side of the master sheet bearing such color substance, thereby transferring a portion of the color substance to said copy sheet to form the design thereon.

11. The process of effecting transfers which comprises applying to a master sheet a mixture of an oil-soluble salt of a basic dye with an organic acid, a wax and a high molecular weight fatty alcohol to form a design in reverse, moistening a copy sheet with a volatile, substantially non-aqueous solvent and applying the moistened copy sheet to the side of the master sheet bearing the color substance, thereby transferring a portion of the color substance to said copy sheet to form the design thereof.

PAUL V. BROWER.